(12) United States Patent
Wessells

(10) Patent No.: US 7,393,150 B2
(45) Date of Patent: Jul. 1, 2008

(54) APPARATUS AND METHOD FOR PAD PRINTING

(76) Inventor: Philip G. Wessells, 13 Middle Ct., Mill Valley, CA (US) 94941

( * ) Notice: Subject to any disclaimer, the term of this patent is extended or adjusted under 35 U.S.C. 154(b) by 0 days.

(21) Appl. No.: 11/309,556

(22) Filed: Aug. 22, 2006

(65) Prior Publication Data

US 2007/0134038 A1 Jun. 14, 2007

Related U.S. Application Data

(63) Continuation of application No. 10/628,749, filed on Jul. 28, 2003, now Pat. No. 7,101,097.

(51) Int. Cl.
*B41J 29/00* (2006.01)
*B41J 13/10* (2006.01)

(52) U.S. Cl. ........................ 400/624; 347/108; 347/104; 400/693

(58) Field of Classification Search ................... None
See application file for complete search history.

(56) References Cited

U.S. PATENT DOCUMENTS 5,277,502 A * 1/1994 Kim ........................... 400/196
5,638,750 A * 6/1997 Sato ........................... 101/126
5,927,873 A * 7/1999 Siwinski ................. 400/120.01
7,093,932 B2 * 8/2006 Inokuchi et al. .............. 347/104
2002/0031351 A1* 3/2002 Hirai ........................... 396/429
2002/0136581 A1* 9/2002 Arledge et al. .......... 400/120.01
2007/0183831 A1* 8/2007 Nakajima .................... 400/629

FOREIGN PATENT DOCUMENTS

JP 09058073 A * 3/1997
JP 2002331726 A * 11/2002

* cited by examiner

*Primary Examiner*—Daniel J Colilla
(74) *Attorney, Agent, or Firm*—Michael E. Woods; Patent Law offices - MEW

(57) ABSTRACT

The present invention includes apparatus and method for image transfer onto one of a plurality of a pad medium pages while the pages are aggregated together. A preferred embodiment for a printer includes a housing; a print engine, within the housing, for transferring an image to a transfer medium when the transfer medium is located at a print position; and a transfer medium registration system, coupled to the print engine, for positioning a pad including a plurality of transfer media releasably secured to one another, wherein the print registration system locates one of the transfer media at the print position. The method including positioning a pad at a print position of a print transfer engine, the pad including a plurality of transfer media releasably secured to one another; and transferring an image to one of the transfer media positioned at the print position.

18 Claims, 2 Drawing Sheets

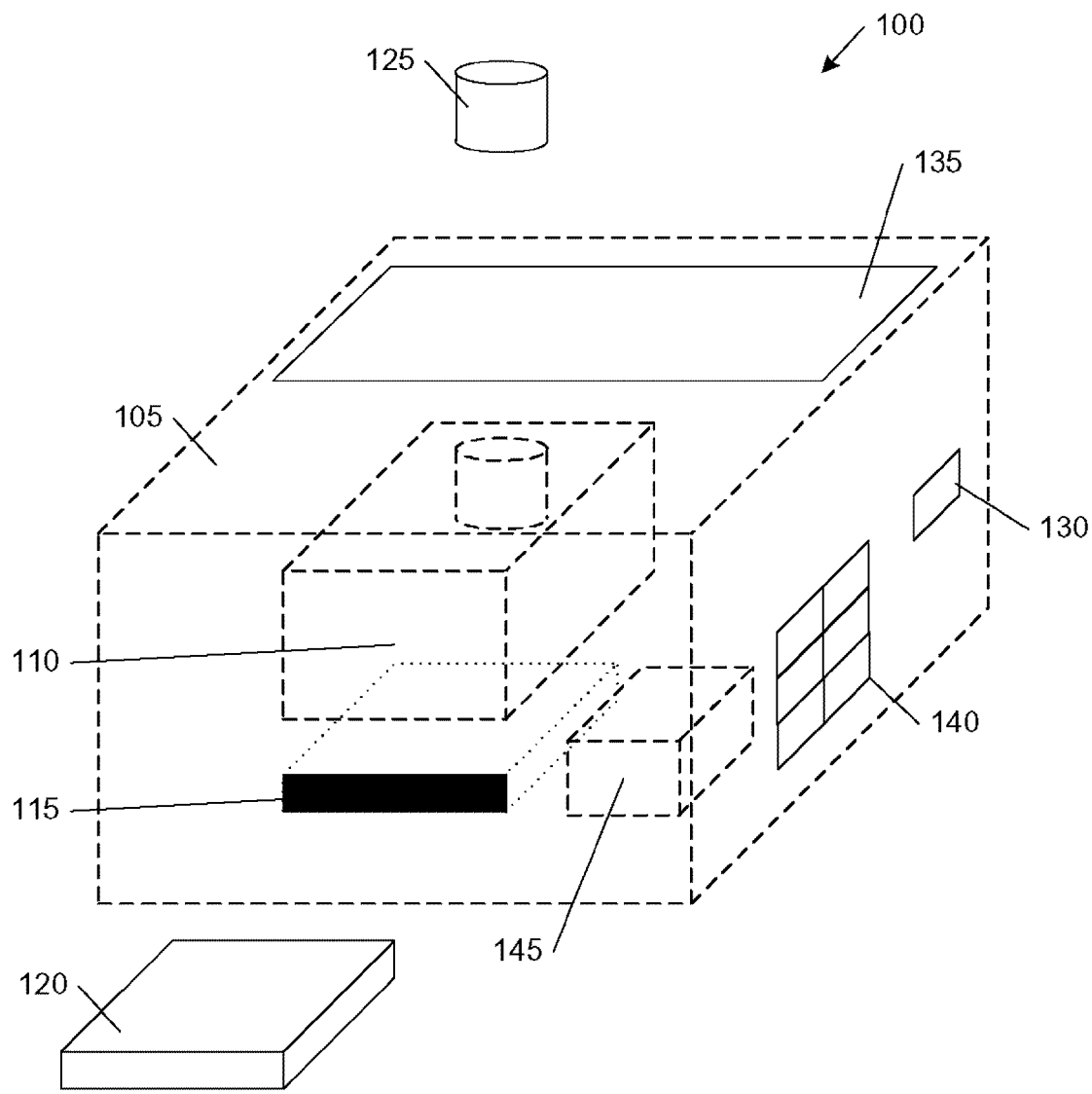
Figure_1

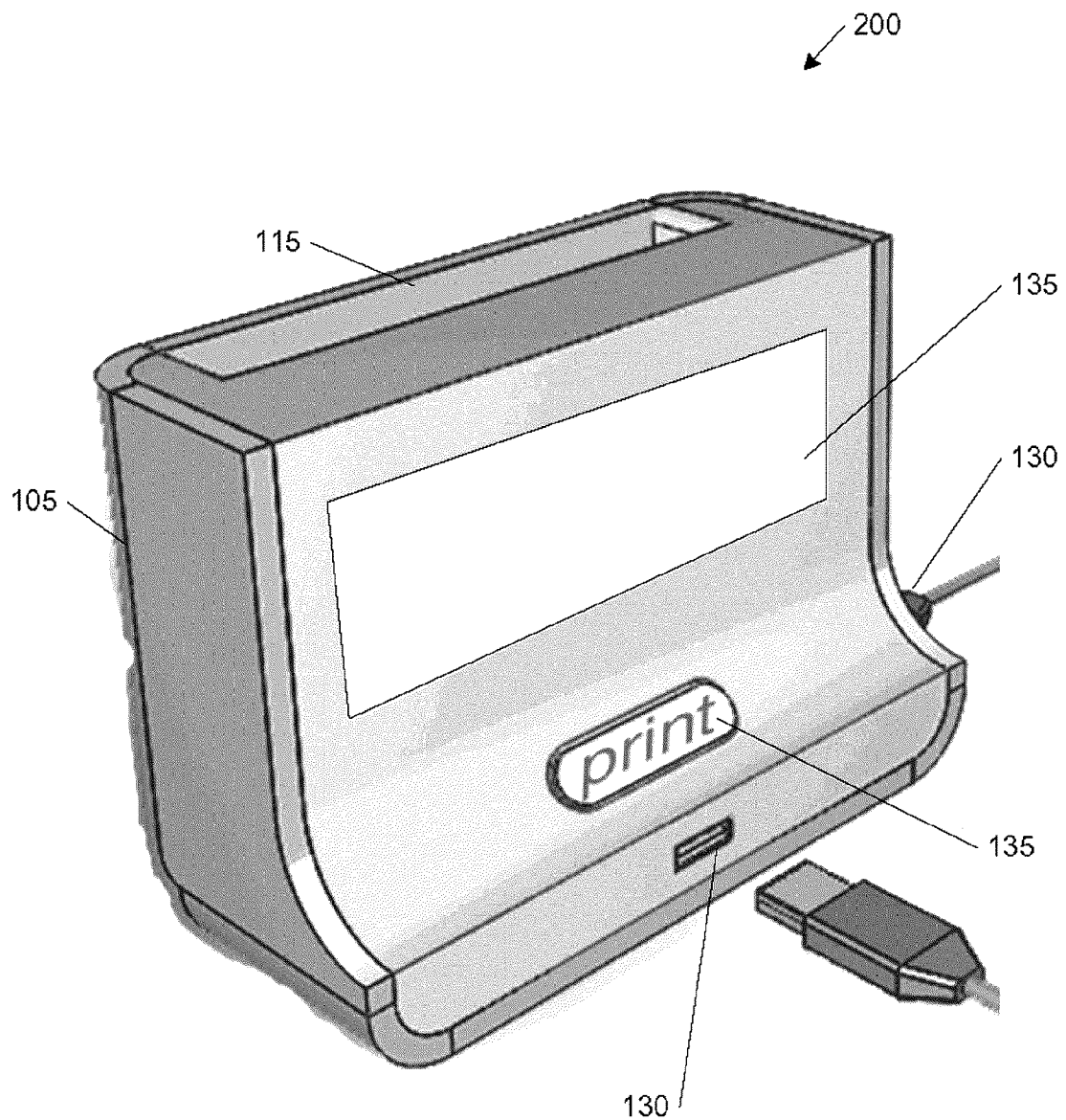
Figure_2

APPARATUS AND METHOD FOR PAD PRINTING

CROSS REFERENCE TO RELATED APPLICATIONS

The present application is a Continuation of U.S. patent application Ser. No. 10/628,749 filed Jul. 28, 2003 and issued as U.S. Pat. No. 7,101,097 and is related to U.S. Pat. No. 6,975,827 entitled "APPARATUS AND METHOD FOR IMAGE CAPTURE AND PAD TRANSFER" and U.S. application Ser. No. 10/628,750 (Abandoned) entitled "APPARATUS AND METHOD FOR ANIMATION PRINTER," U.S. Pat. No. 6,971,806, U.S. application Ser. No. 10/728,118, U.S. application Ser. No. 11/163,803, and 11/164,443. These applications are all hereby expressly incorporated in their entireties by reference for all purposes.

BACKGROUND OF THE INVENTION

The present invention relates generally to printing systems, and more particularly to printing systems for transferring an image to a pad of transfer medium.

There are many types of printing systems available today. These systems include dot-matrix, thermal printers, electrostatic image transfer, ink ejectment, and the like. These systems are adapted for printing successive images on individual sheets of separate pages drawn from a paper reserve stack. There are many different mechanisms for extracting individual sheets and directing them to the image application portion of the printer. What these printers have in common is that the printing systems are adapted for accessing, controlling, routing and printing a single sheet at time.

Pads of note paper, such as Post-It® brand sticky note pads available from 3M Corporation of Minnesota, are well known. These pads include stacks of pages releasably secured to each other with a tacky adhesive that permits an individual page to removed from the pad and re-adhered to another surface. This feature of releasable securement to successive surfaces is a desirable trait of these products.

Currently to produce an image on a sticky note, a user either writes or otherwise applies some text or graphic element on the topmost page of the pad of sticky note. Later, the user removes the note to reposition it to the desired location. It would be advantageous to use a printing system to apply the element to the sticky note page. However, the current printing systems are incapable of printing on such a pad. 3M offers a solution for printing on a preformed matrix of single layer note pages arranged in a standard 8"×11" format for running through a conventional printer.

This solution has disadvantages in that it requires access to, and use of, a full-size printer and associated computer system to reproduce the element on the note. Also, the user has to obtain pages of the special format, as well as special software for use in cooperation with the computer system operating the printer.

BRIEF SUMMARY OF THE INVENTION

The present invention includes apparatus and method for image transfer onto one of a plurality of a pad medium pages while the pages are aggregated together. A preferred embodiment for a printer includes a housing; a print engine, within the housing, for transferring an image to a transfer medium when the transfer medium is located at a print position; and a transfer medium registration system, coupled to the print engine, for positioning a pad including a plurality of transfer media releasably secured to one another, wherein the print registration system locates one of the transfer media at the print position. The method including positioning a pad at a print position of a print transfer engine, the pad including a plurality of transfer media releasably secured to one another; and transferring an image to one of the transfer media positioned at the print position.

The preferred embodiment of the present invention is provided as a stand-alone system for receiving a pad of a plurality of transfer media and for transferring an image to one of the transfer media. Additionally, the printer may be incorporated into a portable image capturing device to directly transfer a captured image onto the pad. The one transfer medium may be printed while attached, or in some implementations, after being stripped from the pad. In some implementations, a print registration system ejects a printed medium after printing, or a user removes the pad after printing, removes the printed medium, and then reinserts the pad. Virtually any image may be transferred, limited by the image transfer engine, the image source quality and pad size. Examples include maps, notes, photos, daily calendar with appointments, to-do items, shopping lists, checklists, and phone numbers.

These and other novel aspects of the present invention will be apparent to those of ordinary skill in the art upon review of the drawings and the remaining portions of the specification.

BRIEF DESCRIPTION OF THE DRAWINGS

FIG. 1 is a block perspective view a preferred embodiment of the present invention for a pad printing system; and FIG. 2 is a perspective view of the preferred embodiment implemented in a desktop printing system.

DETAILED DESCRIPTION OF THE INVENTION

FIG. 1 is a block perspective view a preferred embodiment of the present invention for a pad transfer system 100. Transfer system 100 includes a housing 105, an image transfer engine 110, a transfer registration system 115 for receiving a pad 120.

Housing 105 contains the elements of pad transfer system 100. Housing 105 preferably also may be integrated into other devices (either physically or logically) to provide functionality such, as for example, image capture, image storing, and/or image transmission. Pad transfer system 100 may also be enabled to work cooperatively with an image capture system, with the image capture system physically or logically integrated with pad transfer system 100.

Image transfer engine 110 is a device for applying a text or graphic element onto pad 120 when pad 120 is registered within transfer registration system 115. Image transfer engine 110 may include conventional printing systems such as, for example, a laser printer, an inkjet printer, a thermal printer, a dot-matrix printer, or the like. Image transfer engine 110 may include imaging systems like stenciling and stamping as well. Therefore image transfer engine 110 of the preferred embodiment denotes a system that imparts a perceptible image onto or into one of a transfer medium of pad 120, and the term print is used in a generic sense to include all such transfer processes.

In some implementations, image transfer engine 110 uses a printing system that consumes a print resource during the transfer process (e.g., toner in a laser printer or ink in an inkjet printer). Pad printing system 100 may provide for replaceable resource sources 125 (e.g., an ink cartridge or toner cartridge) or provide for replacement of a complete image transfer engine 110 that is new or refurbished with a fresh supply of the resource.

Pad printing system 100 includes a processing unit for controlling the functions, and includes memory for storing program instructions and, in some cases, images in a format suitable for use with image transfer engine 110. This memory may include portions that are volatile, non-volatile or some combination. In some implementations, pad printing system 100 includes one or more image access ports 130, coupled to the controller, memory, or directly to image transfer engine 110. Image access port 130 is a receiver/receptacle adapted to operatively mate with memory modules storing one or more images for application using pad printing system 100, or for coupling to another device or source of images, such as, for example, a computing system, a camera, a scanner, a video camera, or the like. Some implementations and embodiments of the present invention include rechargeable batteries to power the transfer functions. Access port 130 may be integrated into a docking station for receiving, storing, powering and otherwise interfacing to the image transfer system or to an image capture system, or both. The docking system may be used for systems lacking the rechargeable batteries.

In some implementations of the preferred embodiment, pad transfer system 100 includes a display 135 for reproducing a facsimile of an image to be transferred, or transferred by, image transfer engine 110. Display 135 also provides feedback during control or operation functions. A portion of display 135 provides feedback regarding the status of the image transfer process, such as that system 100 is ready to begin transfer, transfer is ongoing, and/or transfer has completed.

A control system 140 includes one or more buttons coupled to the controller for actuating an image transfer process, selecting an image for transfer, accessing images through access port 130. In the preferred embodiment, control system 140 includes a "PRINT" button, the actuation of which initiates an image transfer process.

Print registration system 115 receives pad 120 and positions one transfer medium of the plurality of transfer media at a location to cooperate with image transfer engine 110 in the image transfer process. Pad 120 of the preferred embodiment is a stack of uniformly sized transfer medium elements (e.g., sheets of paper, though other substrates or materials are possible, including Mylar film, decals, etc.) releasably secured to each other. In the preferred embodiment, pad 120 is a stack of sticky note pads, like the Post-It® sticky note pad product. Registration system 115 locates the topmost transfer medium at the print position and holds pad 120 during the image transfer process.

In some embodiments, registration system 115 may position the bottommost transfer medium, or some other portion of pad 120. Registration system 115 may include an adapter/cartridge for holding pad 120 during image transfer. Such an adapter/cartridge is configurable to permit registration of different sized pads 120 (size differing in thickness and/or peripheral dimensions).

Registration system 115 also includes, in some implementations, a stripper 145 for pulling a single transfer medium off pad 120, either before image transfer or after. Stripper 145, depending upon its functions, may be implemented in numerous different ways. A simple implementation includes a blade or roller that slides between a sheet and the remainder of the pad to lift, separate and remove the sheet.

It is understood that pad print system 100 may also be implemented as a simple device without the display, access ports, and controls. When inserting pad 120 sufficiently far into registration system 115, image transfer begins. An LED is illuminated while the transfer process is in progress. When the LED extinguishes, pad 120 is removed with one of the pages bearing the transfer image.

In operation, a user loads pad 120 into registration system 115 that in turn locates one of the transfer medium at the desired location. A user selects a particular image for transfer, either from internal memory or from an external source through image access port 130. The selected image is viewed on display 135, and the user actuates the "PRINT" button to initiate the transfer system. When the transfer process is completed, the transfer medium, either individually or as part of pad 120, is removed from pad printing system 100.

FIG. 2 is a perspective view of the preferred embodiment implemented in a desktop printing system 200. Desktop printing system 200 is configured as shown in FIG. 1, including having two access ports 130 for accessing images: one coupled to an imaging system (e.g., a camera) and the other to a computing system. System 200 has two operating modes: vertical as shown that operates like a "toaster" and a horizontal mode (not shown) that operates as a "toaster oven."

As used herein, pad 120 includes collections of print media not only secured to each other using a semi-tacky re-attachable adhesive (e.g., Post-It® notes) but also to releasable securement systems such as edge-applied adhesive laminate and other binding systems that hold the media together while permitting one or more medium elements to be detached.

The above-described arrangements of apparatus and methods are merely illustrative of applications of the principles of this invention and many other embodiments and modifications may be made without departing from the spirit and scope of the invention as defined in the claims.

These and other novel aspects of the present invention will be apparent to those of ordinary skill in the art upon review of the drawings and the remaining portions of the specification.

What is claimed as new and desired to be protected by Letters Patent of the United States is:

1. An image transfer apparatus, comprising:
    a housing including an aperture for accepting a pad including a plurality of transfer media releasably secured to one another, said pad having a pad width, a pad length and a pad thickness wherein said aperture includes an aperture width and an aperture length substantially equal to a smallest two of said pad width, pad length and pad thickness;
    a transfer engine, within said housing, for transferring an image to a transfer medium when said transfer medium is located at a transfer position;
    a transfer medium registration system, coupled to said transfer engine, for positioning said pad, wherein said transfer registration system locates one of said transfer media at said transfer position; and
    a media stripper, positioned within said housing during a transfer of said image to said one medium of said transfer media, for removing said located one transfer media from said pad.

2. The image transfer apparatus of claim 1 wherein said transfer engine includes an electrostatic transfer system.

3. The image transfer apparatus of claim 1 wherein said transfer engine includes an ink ejection system.

4. The image transfer apparatus of claim 1 wherein said transfer engine include a thermal transfer system.

5. The image transfer apparatus of claim 1 wherein said transfer medium registration system includes a cartridge for storing said pad.

6. The image transfer apparatus of claim 5 wherein said cartridge adapts a plurality of pads having differing cross-sectional areas to said transfer registration system.

7. The image transfer apparatus of claim 1 wherein said one of said transfer media is a top-most transfer media of said pad.

8. The image transfer apparatus of claim 1 wherein said one of said transfer media is a bottom-most transfer media of said pad.

9. The image transfer apparatus of claim 1 wherein said plurality of transfer media are secured using a semi-tacky adhesive disposed between successive edges of said plurality of transfer media.

10. The image transfer apparatus of claim 1 wherein said plurality of transfer media are secured using an adhesive adhered to a plurality of side edges of said plurality of transfer media.

11. The image transfer apparatus of claim 1 wherein said image transfer engine includes a replaceable cartridge containing a transfer medium for said transfer engine.

12. The image transfer apparatus of claim 11 wherein said transfer engine includes an aperture for controllably ejecting ink and said cartridge contains said ink.

13. The image transfer apparatus of claim 1 wherein said transfer registration system ejects said removed transfer medium from said housing.

14. The image transfer apparatus of claim 1 wherein said transfer engine is a printer.

15. A transferring method, the method comprising:
positioning a pad at a transfer position of a transfer engine, said pad including a plurality of transfer media releasably secured to one another, said pad positioned through an external aperture sized to substantially conform to a smallest of two dimensions of said pad;
transferring an image to one of said transfer media positioned at said transfer position; and
removing said located one transfer media from said pad using a media stripper disposed within said housing during a transfer of an image onto said located one transfer media.

16. The transferring method of claim 15 wherein said one of said transfer media is releasably secured to said pad when said image is transferred.

17. The transferring method of claim 15 wherein said one of said transfer media is detached from said pad when said image is transferred.

18. An image transfer apparatus, comprising:
means for positioning a pad at a transfer position of a transfer engine, said pad including a plurality of transfer media releasably secured to one another, said pad positioned through an external aperture sized to substantially conform to a smallest of two dimensions of said pad;
means, coupled to said positioning means, for transferring an image to one of said transfer media positioned at said transfer position; and
means, coupled to said means for positioning a pad, for removing said located one transfer media from said pad using a media stripper disposed within said housing during a transfer of an image onto said located one transfer media.

* * * * *